United States Patent
Donaldson et al.

(10) Patent No.: US 12,479,324 B2
(45) Date of Patent: Nov. 25, 2025

(54) AUTOMATIC ROUTING THROUGH ELECTRIC VEHICLE CHARGING STATIONS

(71) Applicant: GOOGLE LLC, Mountain View, CA (US)

(72) Inventors: Alex Donaldson, Mountain View, CA (US); David X. Wang, Arncliffe (AU); Kostas Kollias, Mountain View, CA (US); Xin Wei Chow, Mountain View, CA (US); Navin Gunatillaka, Mountain View, CA (US); Jesse Head, Mountain View, CA (US); Michael Graham Woodward, Ultimo (AU); Ingrid Trollope, Mountain View, CA (US); Andrew Foster, Naremburn (AU); Ivan Kuznetsov, Mountain View, CA (US); Sreenivas Gollapudi, Mountain View, CA (US); Christine Nguyen, Mountain View, CA (US); Kyle Morgan, Mountain View, CA (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 17/257,298

(22) PCT Filed: Sep. 3, 2020

(86) PCT No.: PCT/US2020/049174
§ 371 (c)(1),
(2) Date: Dec. 30, 2020

(87) PCT Pub. No.: WO2022/050944
PCT Pub. Date: Mar. 10, 2022

(65) Prior Publication Data
US 2023/0211692 A1 Jul. 6, 2023

(51) Int. Cl.
*B60L 53/65* (2019.01)
*G01C 21/34* (2006.01)

(52) U.S. Cl.
CPC .......... *B60L 53/65* (2019.02); *G01C 21/3469* (2013.01); *B60L 2240/62* (2013.01); *B60L 2240/70* (2013.01)

(58) Field of Classification Search
CPC .. B60L 53/65; B60L 2240/62; B60L 2240/70; B60L 53/60; B60L 2240/60;
(Continued)

(56) References Cited

U.S. PATENT DOCUMENTS

| | | | |
|---|---|---|---|
| 6,021,372 A | 2/2000 | Harrington | |
| 11,397,092 B2 * | 7/2022 | DeLuca | G01C 21/3415 |

(Continued)

FOREIGN PATENT DOCUMENTS

| | | |
|---|---|---|
| EP | 2645062 A2 | 10/2013 |
| JP | 2012-019627 A | 1/2012 |

(Continued)

OTHER PUBLICATIONS

International Search Report and Written Opinion for Application No. PCT/US2020/049174, dated May 28, 2021.

(Continued)

*Primary Examiner* — Aniss Chad
*Assistant Examiner* — Christopher George Fees
(74) *Attorney, Agent, or Firm* — Lerner David LLP

(57) ABSTRACT

To navigate an electric vehicle from a starting location to a destination, a system identifies multiple charging stations between the starting location and the destination and determining a navigation route that requires a least amount of time for the electric vehicle to travel from the starting location to the destination via one or more of the charging stations, including determining a non-linear relationship (Continued)

between an amount of time and an amount of charge the EV receives during the amount of time.

20 Claims, 15 Drawing Sheets

(58) Field of Classification Search
CPC . B60L 2240/72; G01C 21/3469; G01C 21/34; G01C 21/3446; G60W 60/0023; G06Q 50/30; Y02T 10/70; Y02T 10/7072; Y02T 10/72; Y02T 90/12; Y02T 90/16
See application file for complete search history.

(56) References Cited

U.S. PATENT DOCUMENTS

| | | | | |
|---|---|---|---|---|
| 11,430,335 | B2* | 8/2022 | Elisha | G01C 21/3446 |
| 11,584,248 | B2* | 2/2023 | Yu | B60L 53/38 |
| 2010/0094496 | A1* | 4/2010 | Hershkovitz | B60L 50/66 |
| | | | | 701/22 |
| 2012/0089329 | A1 | 4/2012 | Kim et al. | |
| 2012/0109519 | A1* | 5/2012 | Uyeki | B60L 53/68 |
| | | | | 701/426 |
| 2014/0025226 | A1* | 1/2014 | Brown | G01C 21/3682 |
| | | | | 701/1 |
| 2014/0046595 | A1* | 2/2014 | Segawa | G01C 21/34 |
| | | | | 701/400 |
| 2014/0172298 | A1 | 6/2014 | Guo et al. | |
| 2016/0176394 | A1* | 6/2016 | Geller | B60W 20/40 |
| | | | | 701/22 |
| 2016/0380440 | A1* | 12/2016 | Coleman, Jr. | H02J 7/0013 |
| | | | | 700/295 |
| 2017/0138750 | A1* | 5/2017 | Weber | B60L 58/13 |
| 2017/0168493 | A1* | 6/2017 | Miller | G01C 21/3682 |
| 2019/0217735 | A1* | 7/2019 | Donnelly | B60L 53/36 |
| 2019/0308510 | A1* | 10/2019 | Beaurepaire | B60K 35/60 |
| 2019/0316924 | A1* | 10/2019 | Morgan-Brown | |
| | | | | G01C 21/3697 |
| 2020/0089241 | A1* | 3/2020 | Kao | G05D 1/0217 |
| 2020/0333148 | A1* | 10/2020 | Qiu | G01C 21/3476 |
| 2021/0034795 | A1* | 2/2021 | Zhang | G06F 30/13 |
| 2021/0318685 | A1* | 10/2021 | Jenkins | B60L 53/665 |
| 2021/0325891 | A1* | 10/2021 | Young | G01C 21/3446 |
| 2021/0333114 | A1* | 10/2021 | Roggenkamp | G01C 21/3415 |
| 2021/0389144 | A1* | 12/2021 | Kim | G01C 21/3691 |
| 2021/0389145 | A1* | 12/2021 | Liu | B60L 3/12 |
| 2022/0355696 | A1* | 11/2022 | Ahtikari | B60L 53/67 |

FOREIGN PATENT DOCUMENTS

| | | |
|---|---|---|
| JP | 2013-148379 A | 8/2013 |
| WO | WO-2016/020997 A1 | 2/2016 |
| WO | WO-2016/093118 A1 | 6/2016 |
| WO | WO-2018/180583 A1 | 10/2018 |

OTHER PUBLICATIONS

Pourazarm et al., "Optimal Routing of Electric Vehicles in Networks with Charging Nodes: a Dynamic Programming Approach," IEEE International Electric Vehicle Conference (2014).
Zhang et al., "Effective Charging Planning Based on Deep Reinforcement Learning for Electric Vehicles," IEEE Transactions on Intelligent Transportation Systems, 22(1):542-554 (2020).
Japanese Patent Application No. 2022-525409, Notice of Reasons for Rejection, mailing date of Jul. 29, 2024.
First Chinese Office Action for Application No. 202080076521.9, dated Jan. 17, 2025.
Office Action for Korean Patent Application No. 10-2022-7009692 dated Aug. 5, 2025. 11 pages.
Office Action for Chinese Patent Application No. 202080076521.9 dated Sep. 27, 2025. 4 pages.

* cited by examiner

AUTOMATIC ROUTING THROUGH ELECTRIC VEHICLE CHARGING STATIONS

FIELD OF THE DISCLOSURE

The present disclosure relates to navigation directions and, more particularly, to generating navigation directions for an electric vehicle that requires charging stations.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Electric vehicles (EVs) have numerous advantages over conventional vehicles equipped with internal combustion engines. However, operating EVs also presents certain challenges to drivers, such as locating charging stations during a long drive, especially in rural areas. Unlike gas stations, electric charging stations are relatively rare. Further, whereas gas stations offer standardized fuel and nozzle types, a fast rate of refueling, and a predictable range for a vehicle, different electric charging stations include different equipment that is not always compatible with each vehicle, and different rates of charging can create additional delays for drivers of EVs. Still further, the range of an EV depends on many external factors, such as terrain topography, route infrastructure (such as stop signs and traffic signals), and ambient temperature. These factors make accurate trip planning for EV drivers difficult.

SUMMARY

A system of this disclosure generates a navigation route for an electric vehicle (EV) from a starting location to a destination, such that the navigation route corresponds to the least amount of time it will take the EV to reach the destination with one or more stops at electric charging stations, as compared to other candidate paths the system can identify. To this end, the system determines a non-linear relationship between time and the amount of charge a charging station transfers to the EV during this time, e.g., 10 minutes to transfer 10% of the charge capacity, 20 minutes to transfer 15% of the charge capacity, etc.

To prepare for efficient servicing of requests for navigation directions, the system can pre-compute a navigation graph in which charging stations define nodes and edges define paths between pairs of charging stations. The terms "nodes" and "vertices" are used interchangeably in this disclosure. More particularly, the system can construct an initial, highly connected graph with a large number of connections between pairs of charging stations, determine a minimum spanning tree (MST) along which an electric vehicle can travel between charging stations, and select a subset of the remaining edges of the highly connected graph for addition to the MST to define a navigation graph. The system can base the selection of an edge that is not in the MST on whether this edge defines a significantly better path between a pair of charging stations than an indirect path along the MST, e.g., whether this path provides an improvement in time in excess of a certain predefined threshold.

To account for the non-linear dependency between an amount of charge and charge time, the system can generate a bipartite graph for a node that represents a charging station. One set of sub-nodes in the bipartite graph can represent amounts of charge upon arrival at the charging station, and another set of sub-nodes in the bipartite graph can represent amounts of charge upon departure from the charging station, with the edges representing the amount of time it takes to increase the amount of charge. Thus, for example, a sub-node representing a 20% level of charge in the first set can be connected so a sub-node representing an 80% level of charge in the second set via an edge with a weight of 40 to represent a 40-minute delay.

When servicing a request to generate navigation directions from a starting location S to a destination D, the system can add a node to the precomputed navigation graph to represent the starting location S and a node to represent the destination D. The system can connect each of these new nodes to up to X nodes of the precomputed navigation graph. Each of the new connections can represent the shortest path to the corresponding charging station.

Further, the system in some implementations determines or adjusts a non-linear relationship between an amount of time and the amount of charge in view of such factors as the type of EV, the type of equipment available at the charging station, the age of the battery of the EV (when the user chooses to provide this information to the system), etc.

One aspect of these techniques is a method for navigating an electric vehicle from a starting location (or "origin") to a destination. The method is implemented using processing hardware such as one or more processors configured to execute software instructions stored on a computer-readable medium. The method includes identifying multiple charging stations between the starting location and the destination and determining a navigation route that requires a least amount of time for the EV to travel from the starting location to the destination via one or more of the plurality of charging stations, including determining a non-linear relationship between an amount of time and an amount of charge the EV receives during the amount of time.

Another aspect of these techniques is a computing system configured to implement the method above.

DETAILED DESCRIPTION

Generally speaking, a system of this disclosure efficiently generates a navigation route via one or more electric charging stations, for an electric vehicle (EV). A system in which these techniques can be implemented is discussed with reference to FIG. 1; various techniques for computing, pre-computing, and applying a graph to generate such a route are discussed with reference to FIGS. 2-10; and several example user interface (UI) screens which the system can generate are discussed with reference to FIGS. 12A-C.

Figure 1:
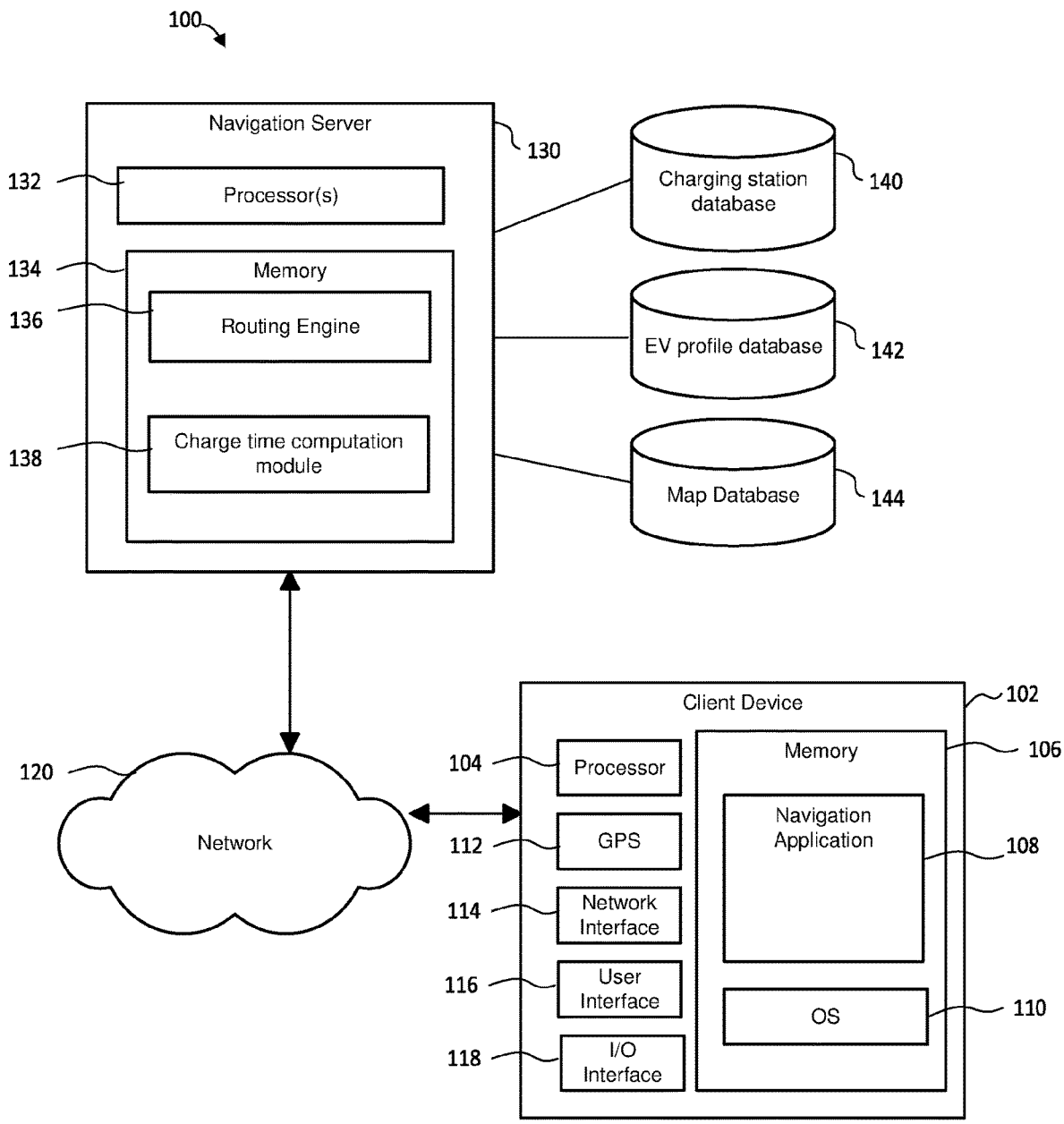
FIG. 1 illustrates a block diagram of an example system in which the techniques of this disclosure for generating navigation routes for electric vehicles can be implemented.

Referring first to FIG. 1, an example system 100 for includes a client computing device 102 (also referred to herein as a "client device") communicatively coupled to a navigation server 130 (also referred to herein as "server 130") via a network 120. The network 120 in general can include one or more wired and/or wireless communication links and may include, for example, a wide area network (WAN) such as the Internet, a local area network (LAN), a cellular telephone network, or another suitable type of network.

The client device 102 can be a navigation module embedded in an EV. Alternatively, the client device 102 can be a portable device such as a smart phone, a tablet computer, a laptop computer, a wearable device such as a smart glasses, or another suitable computing device. The client device 102 can include processing hardware such as one or more processors (CPUs) 104 and a computer-readable non-transient memory 106 storing instructions which the one or more processors 104 can execute. The client device 102 also can include a global positioning system (GPS) module 112 or another suitable positioning module, a network interface 114, a user interface 116, and an input/output (I/O) interface 118. The client device 102 may also include components not shown in FIG. 1, such as a graphics processing unit (GPU).

The network interface 114 can include one or more communication interfaces such as hardware, software, and/or firmware for enabling communications via a cellular network, a Wi-Fi™ network, or any other suitable network such as the network 120. The user interface 116 can include one or more input devices configured to receive user commands, such as a touchscreen, a keyboard, a microphone, a camera, etc. and one or more output devices configured to provide visual, audio, and/or tactile output, such as touchscreen or a speaker. When the client device 102 is embedded in an EV, the user interface 116 can include components of the head unit of the vehicle. The I/O interface 118 may include various additional I/O components via which the client device 102 can interact with peripheral devices such.

The memory 106 may be a non-transitory memory and may include one or several suitable memory modules, such as random access memory (RAM), read-only memory (ROM), flash memory, other types of persistent memory, etc. The memory 106 can store machine-readable instructions executable on the one or more processors 104 and/or special processing units of the client device 102. The memory 106 also stores an operating system (OS) 110, which can be any suitable mobile or general-purpose OS. In addition, the memory can store one or more applications that communicate data via the network 120, including a navigation application 108. Communicating data can include transmitting data, receiving data, or both. The OS 110 may include application programming interface (API) functions that allow applications to access information from the GPS module 112 or other components of the client device 102. For example, the navigation application 108 can include instructions that invoke an OS 110 API for retrieving a current geographic location of the client device 102.

The navigation application 108 can receive requests for navigation directions from a user, format and transmit these requests to the navigation server 130, receive and display and/or vocalize the navigation directions, etc. Additionally, the navigation application 108 can display interactive digital maps and provide various geolocated content for example. Although FIG. 1 illustrates the navigation application 108 as a standalone application, the functionality of the navigation application 108 also can be provided in the form of an online service accessible via a web browser executing on the client device 102, as a plug-in or extension for another software application executing on the client device 102, etc. The navigation application 108 generally can be provided in different versions for different respective operating systems. For example, the maker of the client device 102 can provide a Software Development Kit (SDK) including the navigation application 108 for the Android™ platform, another SDK for the iOS™ platform, etc.

The navigation server 130 can provide to receive and process requests for navigation directions from the client device 102 and other devices. A requests can indicate that the request pertains specifically to an EV rather than a conventional vehicle. The server 130 includes processing hardware such as one or more processors 132 and a memory 134, which can be a tangible, non-transitory memory with one or more suitable memory modules such as RAM, ROM, flash memory, other types of persistent memory, etc. The memory 134 stores instructions executable on the processors 132 that make up a routing engine 136, which can process requests for navigation directions and generate the requested navigation directions using data stored in various databases such as the databases 140-144 discussed below. As discussed below, the routing engine 136 also can pre-compute a navigation graph for EVs and apply the graph to particular requests to reduce the response time. The instructions also make up a charge time computation module 138 configured to determine an amount of recommended time an EV should spend at a certain charging station.

The server 130 can be communicatively coupled to a database 140 storing information about charging stations. As discussed in more detail with reference to FIGS. 3 and 11, the database 140 can store locations and profiles of charging stations. In some implementations, the database 140 also can store real-time data such the number of ports currently available or the size of the queue, when applicable.

The server 130 also can be communicatively coupled to a database 142 storing profiles of electric vehicles. When the user indicates his or her willingness to indicate the type of EV the user is driving (e.g., by operating certain controls on the client device 102 or installing certain applications), the server 130 can attempt to better match the charging stations to the user's EV, and in some cases modify the navigation route accordingly.

Still further, the server 130 can be communicatively coupled to a map database 144 that stores schematic, photographic (e.g., street-side), and/or satellite map data. The map data in general can correspond to street and road information, topographic data, satellite imagery, information related to public transport routes, information about businesses or other points of interest (POI), navigation data such as directions from for various modes of transportation, etc. The server 130 can provide map data to the client device 102 in the form of map tiles, for example, for generating interactive digital maps.

In general, the server 130 may receive information related to geographic locations from any number of suitable databases, web services, etc. For example, the server 130 may be coupled to a weather database (not shown) which includes current or average weather data in various geographic areas, a natural disasters database (not shown) including current or common natural disasters that occur in various geographic areas, and/or a traffic database including current or average vehicle and/or pedestrian traffic on a road, path, or area.

Figure 2:
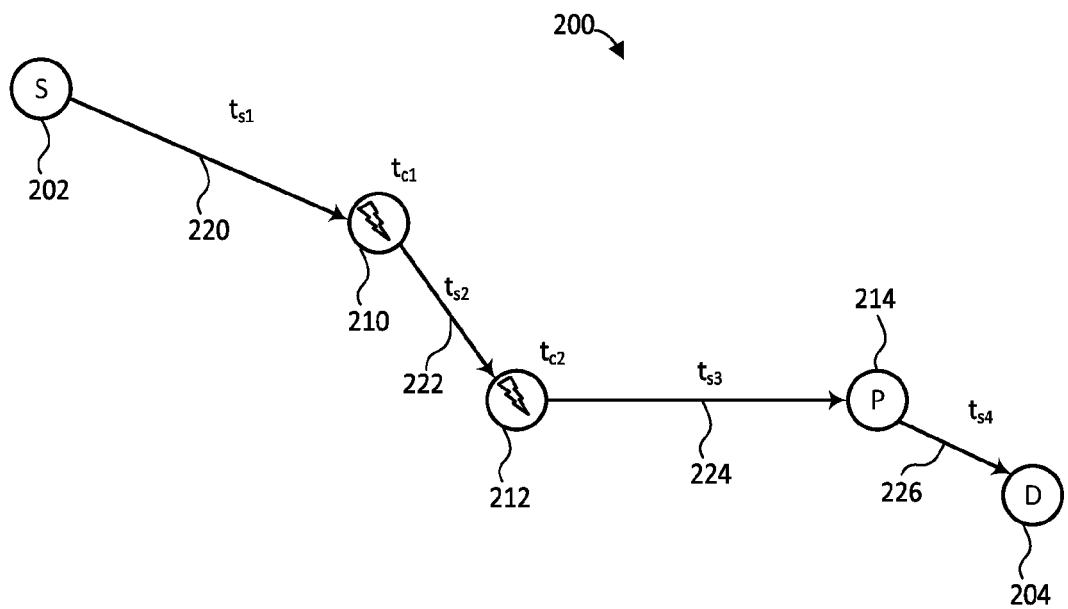
FIG. 2 illustrates an example navigation route including a "daisy chain" of electric charging stations, generated in accordance with the techniques of this disclosure.

Next, FIG. 2 illustrates an example navigation route 200 that includes a daisy chain of several electric charging stations, the routing engine 136 can generate in response to a request from the client device 102. The navigation route 200 can be understood as a directed graph starting at a node 202 corresponding to the starting location S and terminating a node 204 corresponding to the destination D. The navigation route 200 includes an intermediate node 210 corresponding to a charging station, an intermediate node 212 corresponding to another charging station, and a user-added waypoint 214. The edge 220 between nodes 202 and 210 defines the first travel segment and is associated with travel time $t_{s1}$, the edge 222 between nodes 210 and 212 defines the second travel segment and is associated with travel time $t_{s2}$, the edge 224 between the nodes 212 and 214 defines the third travel segment and is associated with travel time $t_{s3}$, and the edge 226 between the nodes 214 and 204 defines the fourth, final travel segment and is associated with travel time $t_{s3}$. Further, nodes 210 and 212 are associated with charge times $t_{c1}$ and $t_{c2}$, respectively. Thus, the overall travel time of the navigation route 200 is $T_{total}=t_{s1}+t_{s2}+t_{s3}+t_{s4}+t_{c1}+t_{c2}$.

Figure 3:
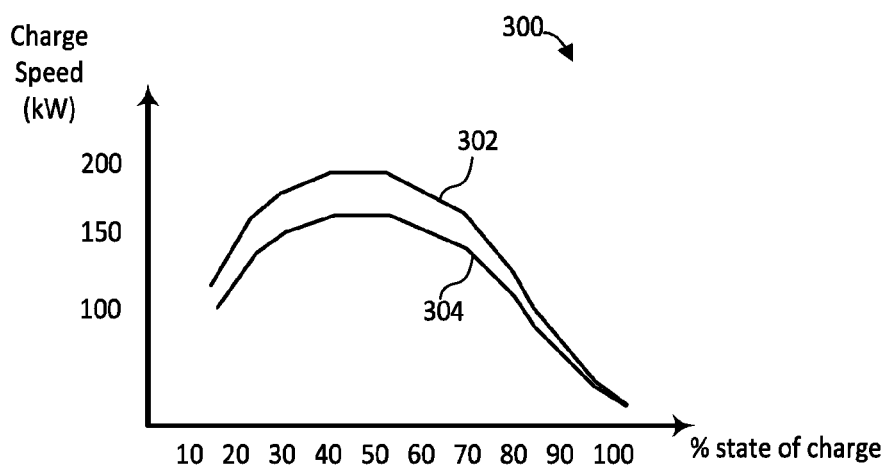
FIG. 3 illustrates an example charge profile of an electric vehicle.

FIG. 3 illustrates an example charge profile graph 300 for example EVs. The routing engine 136 can generate a navigation route such as the route 200 in view of a non-linear relationship between the amount of charge and the amount of time required to transfer this amount to the battery of the EV. According to example profile 302 for a certain EV, the charge speed increases when the EV charges from 20% to 30%, or from 30% to 40% for example. However, the charge speed decreases when the EV charges from 50% to 60% for example, and decreases more drastically when EV charges from 90% to 100%. An example profile 304 for another EV illustrates a generally similar relationship between time and the rate of charge, but this EV achieves a lower top rate of charge.

The routing engine 136 can store indications of whether a charging station matches a certain profile (e.g., the profile 302, 304) for an EV. Thus, the charge profile graph 300 can be understood as applicable to a charging station as well as an EV.

Figure 4:
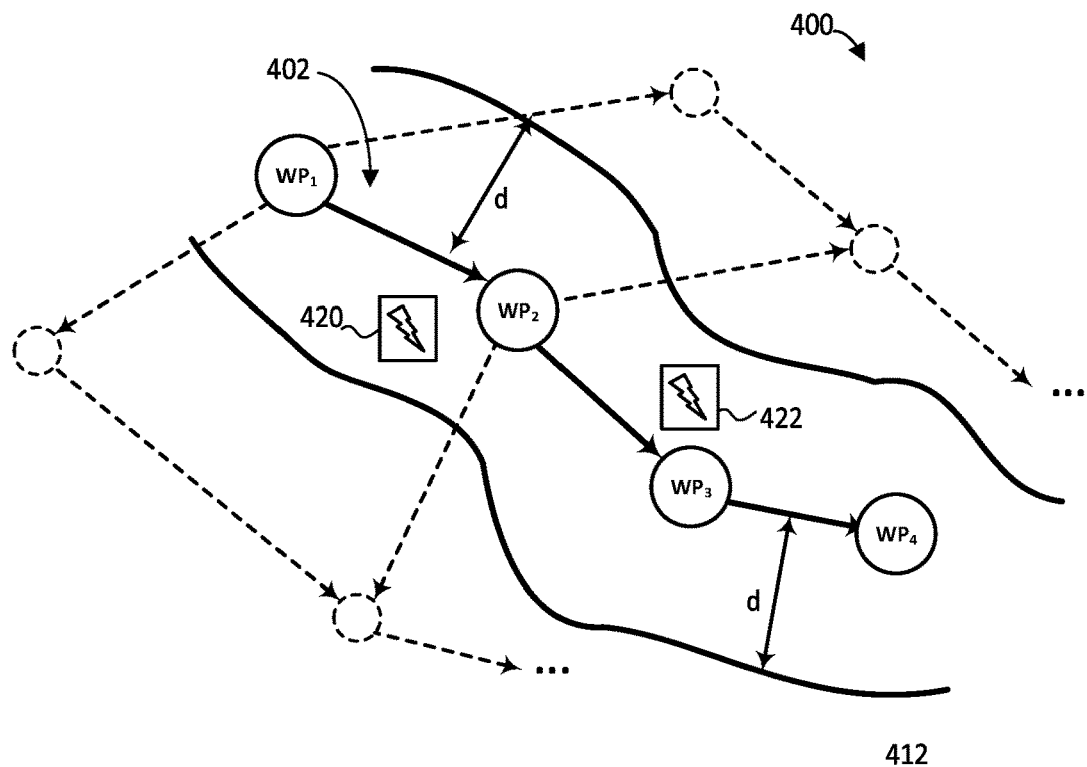
FIG. 4 schematically illustrates generation of a navigation route using an iterative search-along-route (SAR) technique.

Next, FIG. 4 schematically illustrates an iterative search-along-route (SAR) approach for adding charging stations to a navigation route, which the system of FIG. 1 can use in some implementations. The routing engine 136 according to this approach selects a navigation route 402 for an EV that traverses waypoints $WP_1$, $WP_2$, $WP_3$, and $WP_4$ (only a portion of the navigation route 402 is shown). These waypoints can represent places where a vehicle turns from one road onto another road, for example. The routing engine 136 generates the navigation route 402 based on time or distance between the waypoints and selects this route from among other candidate routes that traverse candidate waypoints in a diagram 400.

The routing engine 136 then picks a charging station near the end of the range of the EV. For example, the routing engine 136 identifies a charging station 420 near waypoint $WP_1$ and a charging station 422 near $WP_2$. In both instances, the routing engine 136 limits the search for charging stations to geographic areas within distance d from the navigation route 402. The routing engine 136 in this case determines that the charging station 422 is within range of the EV traveling along the navigation route from 402 from the starting location or the previous charging station, and accordingly add the charging station 422 to the navigation route 402. The routing engine 136 then can repeat these steps to locate the next charging station along the navigation route 402. To this end, the routing engine 136 can assume that the EV receives a certain amount of charge (e.g., 80%) at the charging station 422.

The iterative SAR technique the routing engine 136 uses in this case is a semi-greedy algorithm and, as such, it can produce sub-optimal solutions (or fail to find a solution in some cases). Alternatively, the routing engine 136 can represent charging stations as nodes of a graph and implement a graph search technique, as discussed below.

Figure 5:
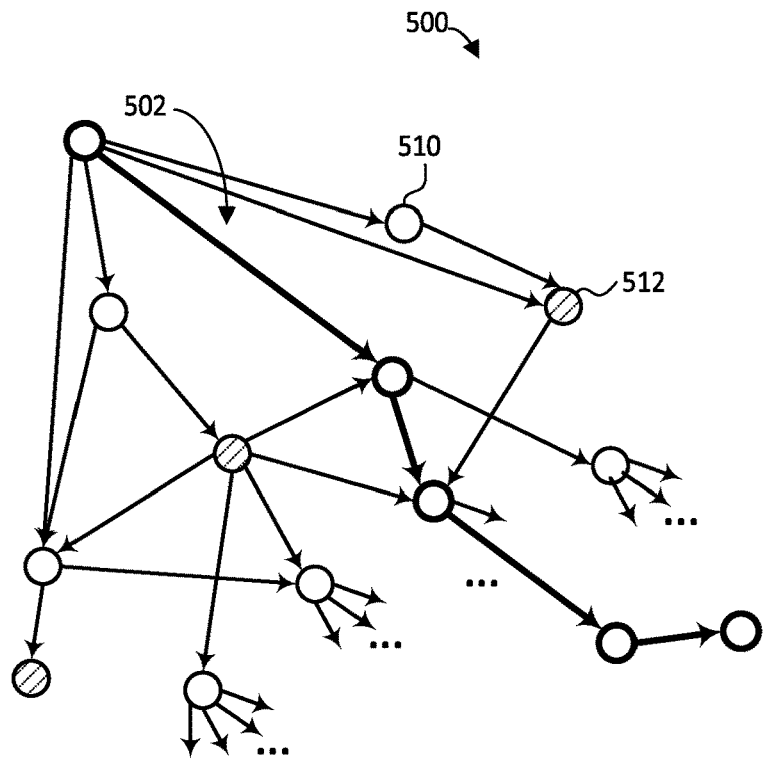
FIG. 5 schematically illustrates generation of a navigation route using a graph search technique.

Referring to FIG. 5, a graph 500 is highly connected (i.e., having a large number of edges) to include a large number of potential paths between charging stations represented as nodes. Edges of the graph 500 represent paths between pairs of charging stations, which can be of any complexity and include any suitable of intermediate waypoints. FIG. 5 illustrates nodes that represent charging stations incompatible with a certain EV using shading to indicate that the routing engine 136 can exclude these nodes when searching for a navigation route. Thus for example a node 510 represents a charging station with a profile that generally matches the profile of an EV (see FIG. 3), and a node 512 represents a charging station with a profile that does not sufficiently match the profile of the EV. As a more specific example, the profile of the charging station can fail to offer a sufficiently high charge speed or simply include incompatible equipment due to differences in makes, brands, etc.

In any case, the routing engine 136 can generate a navigation route 502 that traverses several charging stations, which define a daisy chain. The routing engine 136 can use a suitable search algorithm such as Dijkstra's or an A* search algorithm. Example graph construction techniques the routing engine 136 can use are discussed below with reference to FIGS. 6 and 7A-C, but first the general requirements the routing engine 136 can implement are briefly discussed.

In order for a graph to be suitable for identifying a navigation route for a certain EV, each potentially selectable node must define a charging station suitable for the EV. As indicated above, the routing engine 136 can determine compatibility of an EV with a charging station to eliminate incompatible nodes from the graph. In some implementations, the routing engine 136 additionally eliminates charging stations that do not satisfy a certain trust score requirement. The routing engine 136 can determine the trust score based on feedback from drivers, for example.

Another requirement the routing engine 136 can implement is that it finds the fastest route between the charging stations. When generating these routes as edges of the graph 500, the routing engine 136 can enforce an upper bound on how far each station (node) can expand (e.g., 500 km). When determining the weight of an edge (representing the expected energy usage), the routing engine 136 can account for changes in elevation and other topographic properties, speed limits, types of roads, etc. In some implementations, the routing engine 136 can dynamically adjusts the weights of edges due to weather conditions, as performance of an EV generally varies more with weather as compared to a vehicle equipped with an internal combustion engine.

Further, when searching for a navigation route, the routing engine 136 can apply user-specified preferences such as "avoid highways" for example. Other examples of conditions or user preferences include generation of "energy-conscious" ecological routes (or "eco-routes") to optimize energy consumption. The routing engine 136 in this case can seek to avoid hills, changes in elevation or, more generally, avoiding certain types of routes.

For each charging station, the routing engine 136 can estimate the charging time as a "cost" of stopping at the charging station. As discussed with reference to FIG. 11, the charging time varies significantly in accordance with the amount of charge (unlike traditional gas stations, where the time difference between filling half a tank and a full tank is negligible); moreover, the relationship between the amount of time and the amount of charge is generally non-linear, as illustrated in FIG. 3. When the routing engine 136 is aware of multiple charging ports at a charging station, the routing engine 136 can rely on the fastest ports for calculation.

Further, when generating a navigation route, the routing engine 136 can estimate an amount of charge the EV should receive in view of the next edge of the graph the EV is to traverse. For example, the routing engine 136 can determine that an EV should charge up to 60% at a certain charging station, even though the rate of charge is relatively slow between 50% and 60%, because the next edge included the navigation route is relatively long. In another case, the routing engine 136 can determine that the EV should charge up to only 40% to avoid the slower charge rate because the next edge included the navigation route is relatively short.

Overall, the routing engine 136 can seek to minimize the total trip time as well as the total charge time:

$$\text{Time}_{trip} = \min(\Sigma \text{segment\_time}_i + \Sigma \text{charge\_time}_j) \quad \text{(Eq. 1)}$$

In some implementations, the routing engine 136 applies the requirement that the EV reach each station at a certain minimum battery level (e.g., 15%). A user can set this level manually via the UI of the client device 102 for example, or the routing engine 136 can select and apply the minimum battery level automatically. In another implementation, the user indicates his or her willingness to share certain information about the past trips the system of FIG. 1, and the routing engine 136 uses machine learning techniques to automatically estimate the user's preference of the minim battery level.

The routing engine 136 in some implementations also checks real-time data to update navigation directly dynamically. For example, the routing engine 136 can check real-time availability of charging ports and, in response to determining that no parts are available at a charging station, attempt to find an alternate path via another charging station, or possibly recommend that the EV not stop to the charging station and proceed directly to the next one along the navigation route.

Figure 6:
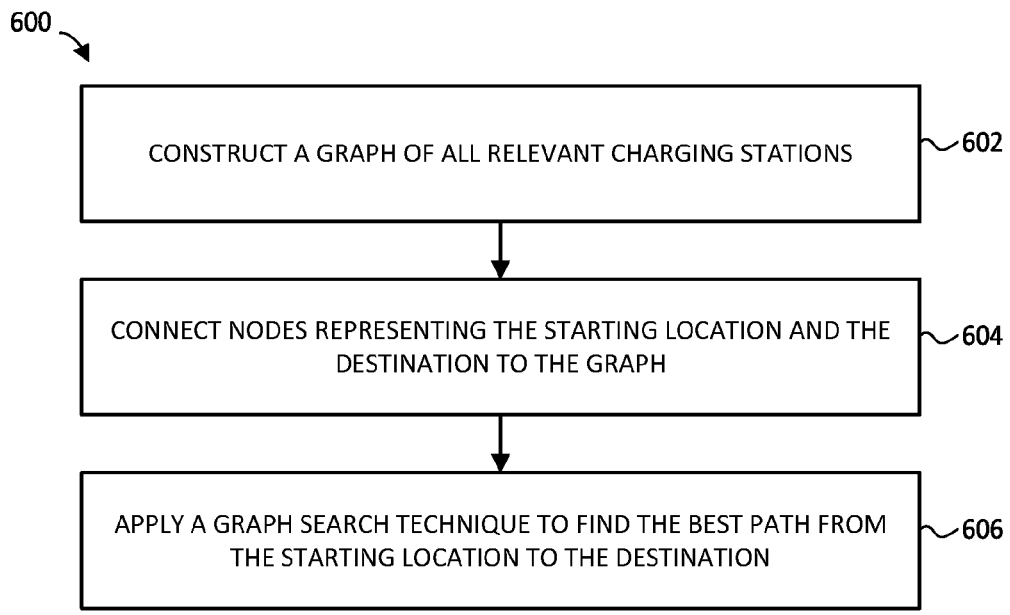
FIG. 6 is a flow diagram of an example method for generating a navigation path for an EV via one or more charging stations using a connected graph, which can be implemented in the system of FIG. 1.
Figure 7A:
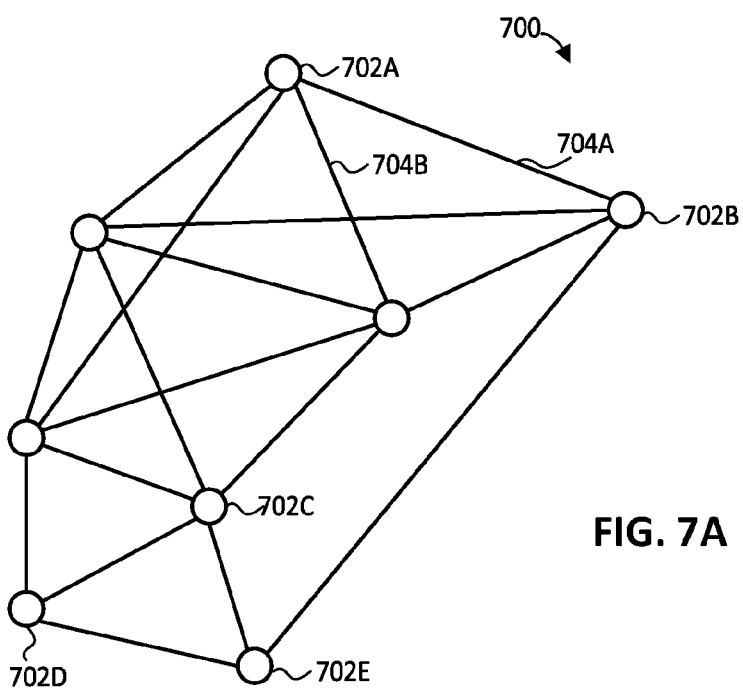
FIGS. 7A-C illustrate example generation of a navigation in accordance with the method of FIG. 6.

Now referring to FIG. 6, the routing engine 136 can implement a method 600 to generate a navigation route between a source location and a destination using a graph in which charging stations define nodes and paths between charging stations define edges. The method 600 begins at block 602, where the routing engine 136 constructs a graph of the relevant (e.g., compatible, satisfying the trust score) charging stations. FIG. 7A illustrates an example graph 700 which the routing engine 136 can construct at block 602. Depending on the implementation, the routing engine 136 can construct the graph 700 in real time or pre-compute the graph 700 to make the subsequent generation of a navigation route quicker. In any case, the graph 700 includes nodes 702A, 702B, etc. interconnected by edges 704A, 704B, etc. The routing engine 136 in some cases constructs the graph 700 by reducing a highly connected to an MST and a set of additional edges that provide a certain level of improvement to paths, as discussed in more detail below.

Figure 7B:
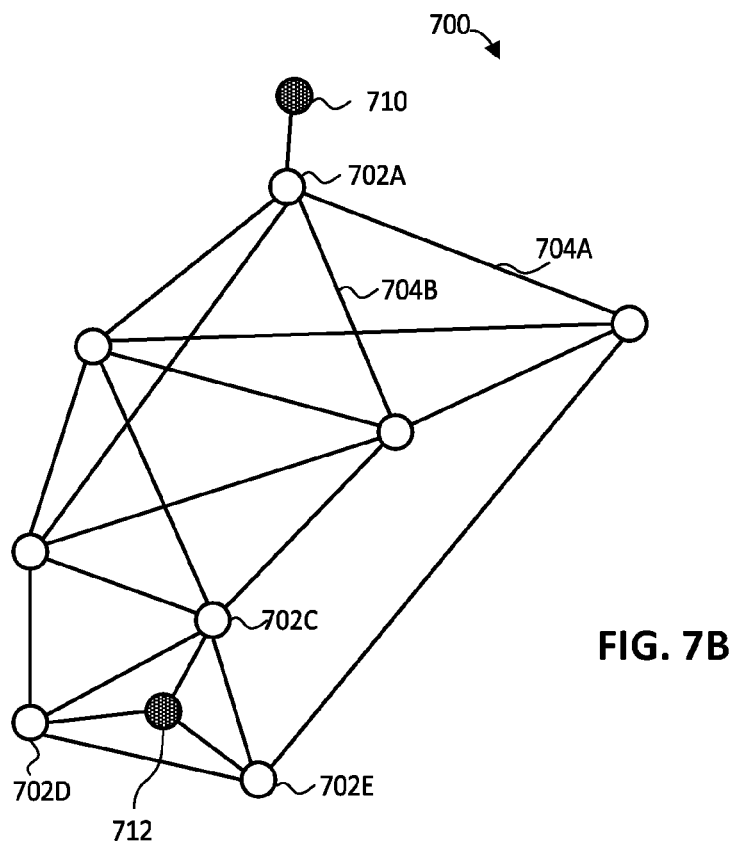

At block 604, the routing engine 136 generates nodes representing the starting location and the destination and connects these nodes to the graph. The starting location and the destination need not correspond to charging stations, and thus can define temporary nodes. As illustrated in FIG. 7B, a temporary node 710 can be proximate to the node 702, and a temporary node 712 can be proximate to the nodes 702C, 702D, and 702E. Node 710 in this example can correspond to the starting location, and node 712 can correspond to the destination. To connect the nodes 710 and 712 to the graph 700, the routing engine 136 can impose a certain limit based on time or distance, e.g., connect these temporary nodes to all nodes of the graph 700 within X miles or within Y minutes of travel.

Figure 7C:
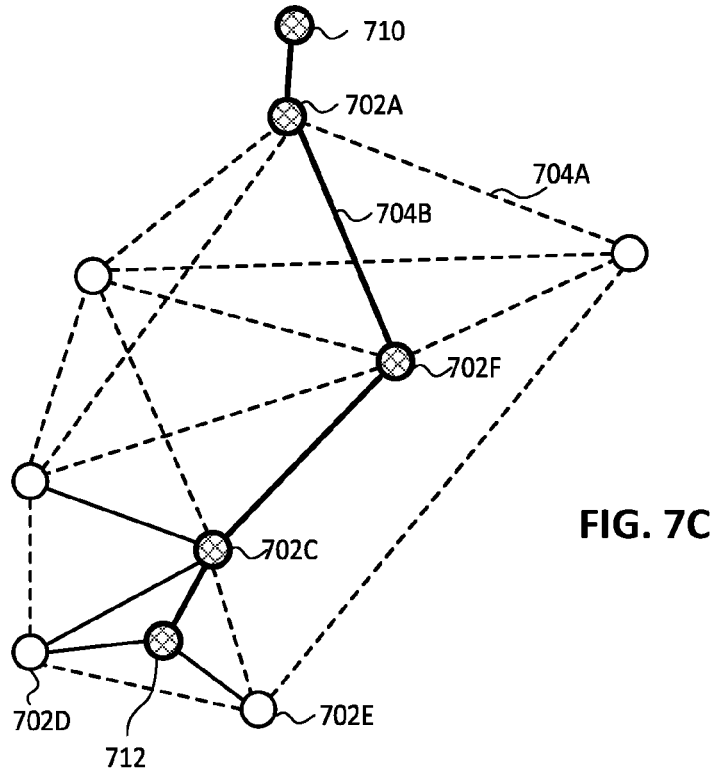

At block 606, the routing engine 136 applies a graph search technique to find a navigation route from the starting location to the destination. As illustrated in FIG. 7C for example, the routing engine 136 generates a path that starts at the temporary node 710, proceeds to the node 702A (via a temporary edge), and the proceeds via the nodes 702F and 702C of the graph to the temporary node 712.

Generally speaking, constructing a graph in real time is difficult because for an A* problem, the number of calls to a function that generates a path can be estimated as $$D = B \cdot (B^*)^d, \quad \text{(Eq. 2)}$$

where B is the branching factor, B* is the "effective" branching factor when using the A* heuristic, and d is the depth (or number of charging stops needed for the best route). Assuming a branching factor of a thousand (e.g. 5000 charging stations on average within a circle of radius 500 km), and a heuristic that optimistically eliminates 99% of options (B*=50), then for the most common use case of requiring a single charging stop, the routing engine 136 would require ~250,000 calls to a function that generates a path; with 2 stops, approximately 12.5 million calls are needed, and so on. Therefore, in many cases it is impractical for the routing engine 136 to a navigation graph (e.g., the graph 500 or 700) in real-time, without relying on at least some precomputation and caching.

Figure 8:
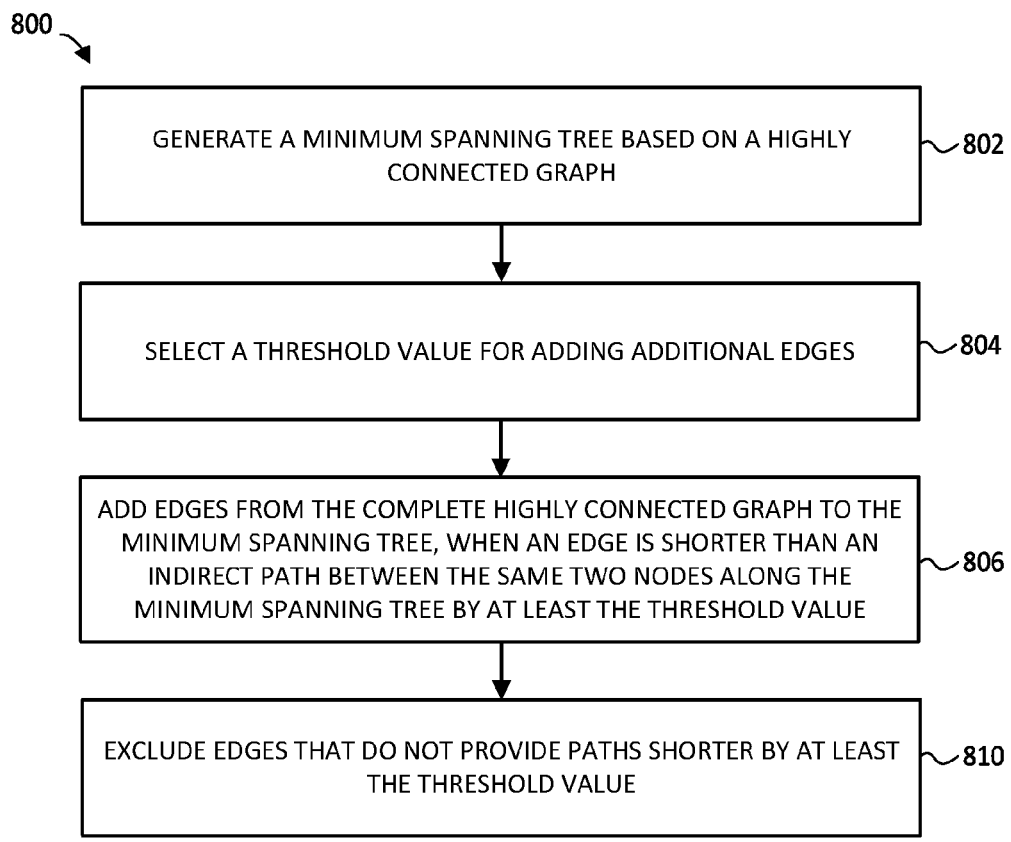
FIG. 8 is a flow diagram of an example method for pre-computing a graph based on multiple charging stations, which can be implemented in the system of FIG. 1.

To more quickly service requests for navigation directions, the routing engine 136 in some implementations pre-computes a navigation graph in accordance with a method 800 of FIG. 8.

At block 802, the routing engine 136 constructs an initial, highly connected graph interconnecting a large number of nodes representing charging stations. The routing engine 136 then generates a minimum spanning tree (MST) based on the highly connected graph. Generally speaking, an MST (also known as a minimum weight spanning tree) is a subset of the edges of a connected undirected graph, such that all the nodes are connected without any cycles. When the edges have respective weights, an MST also provides the minimum possible total weight of the edges.

Figure 10A:
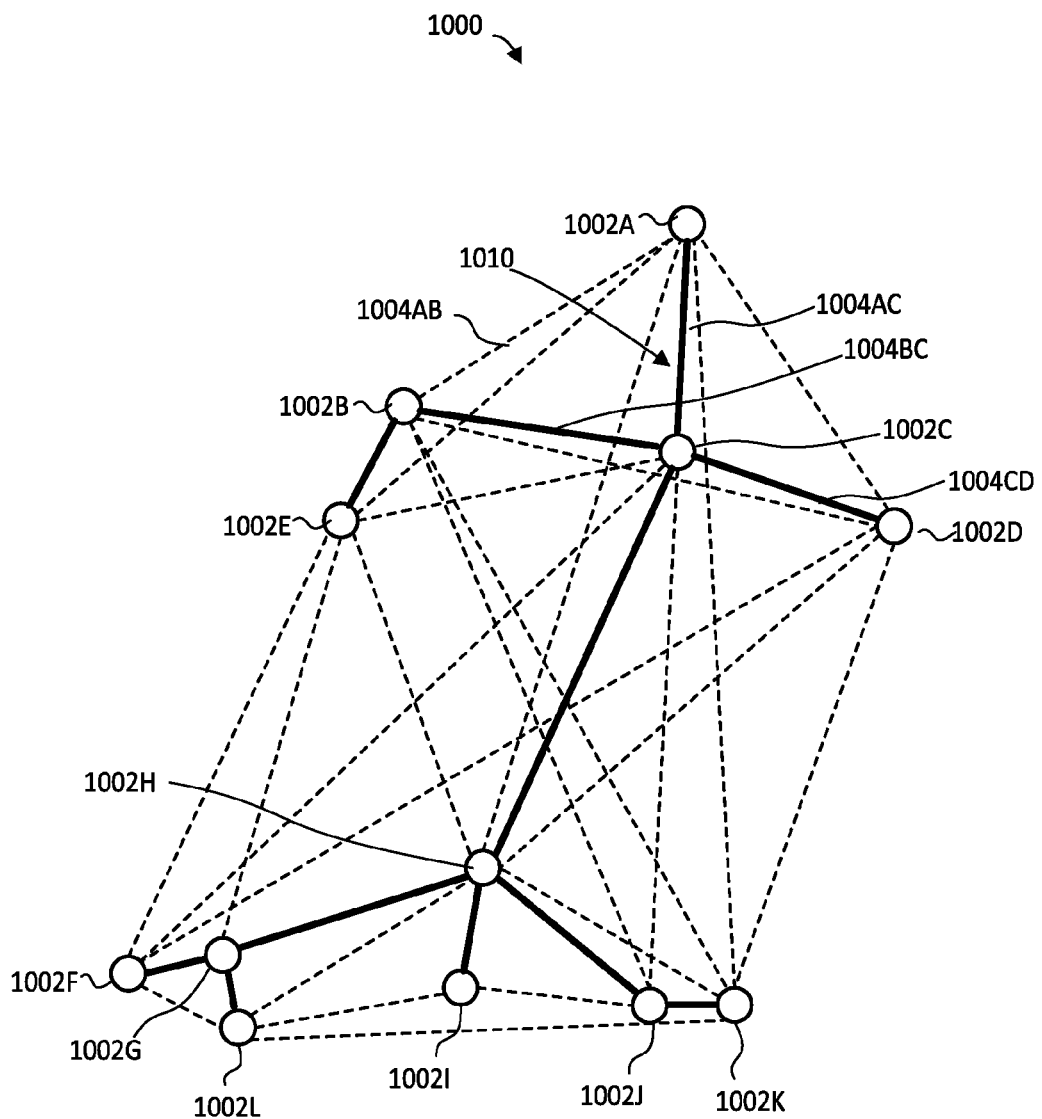
FIGS. 10A-D illustrate example pre-computation of a navigation in accordance with the method of FIG. 8.

Referring for example to FIG. 10A, a highly connected graph 1000 includes nodes 1002A, 1002B, . . . 1000L and edges between these nodes such as an edge 1004AB interconnecting the nodes 1002A and 1002B, an edge 1004BC interconnecting the nodes 1002 and 1002C, etc. Each of the edges 1004AB, 1004BC, etc. can have a weight that represents one or more of the following metrics: the amount of energy required to travel between the nodes in a certain direction, an amount of time required, a distance between the nodes, etc. It is noted that the energy consumption may not be the same for opposite directions of travel between two nodes: for example, a charging station $S_1$ can be located at a higher altitude than a charging station $S_2$, and an EV requires less energy to travel from $S_1$ to $S_2$ as compared to travel from $S_2$ to $S_1$. Further, the edges 1004AB, 1004BC, etc. can represent multi-segment, potentially complex, paths. The nodes 1002A, 1002B, etc. thus differ from travel waypoints of navigation directions in at least this regard.

An MST 1010 in this example interconnects the nodes 1002A and 1002C via the edge 1004AC, and excludes all other paths between the nodes 1002A and 1002C, as a matter of definition of an MST. The MST 1010 further interconnects the nodes 1002B and 1002C via the edge 1004BC, the nodes 1002C and 1002D via an edge 1004CD, etc. The MSG 1010 excludes most edges of the graph 1000, such as the edge 1006AB for example. FIG. 10 illustrates the excluded edges using dashed lines.

Referring back to FIG. 8, the routing engine 136 then selects a threshold value for adding edges to the MST from the underlying connected graph. When a path between two nodes improves an MST path between the same two nodes by at least the threshold value, the routing engine 136 can add the one or more edges of this improved path to the MST. The threshold value can be expressed in relative terms as a percentage of improvement (e.g., 10% improvement in time or energy) or in absolute terms (e.g., improvement by 10 minutes or 1% of the battery). Then, at block 806, the routing engine 136 adds edges that satisfy the threshold value criterion obtained at block 804. The routing engine 136 excludes the other edges of the underlying graph, at block 810.

Figure 10B:
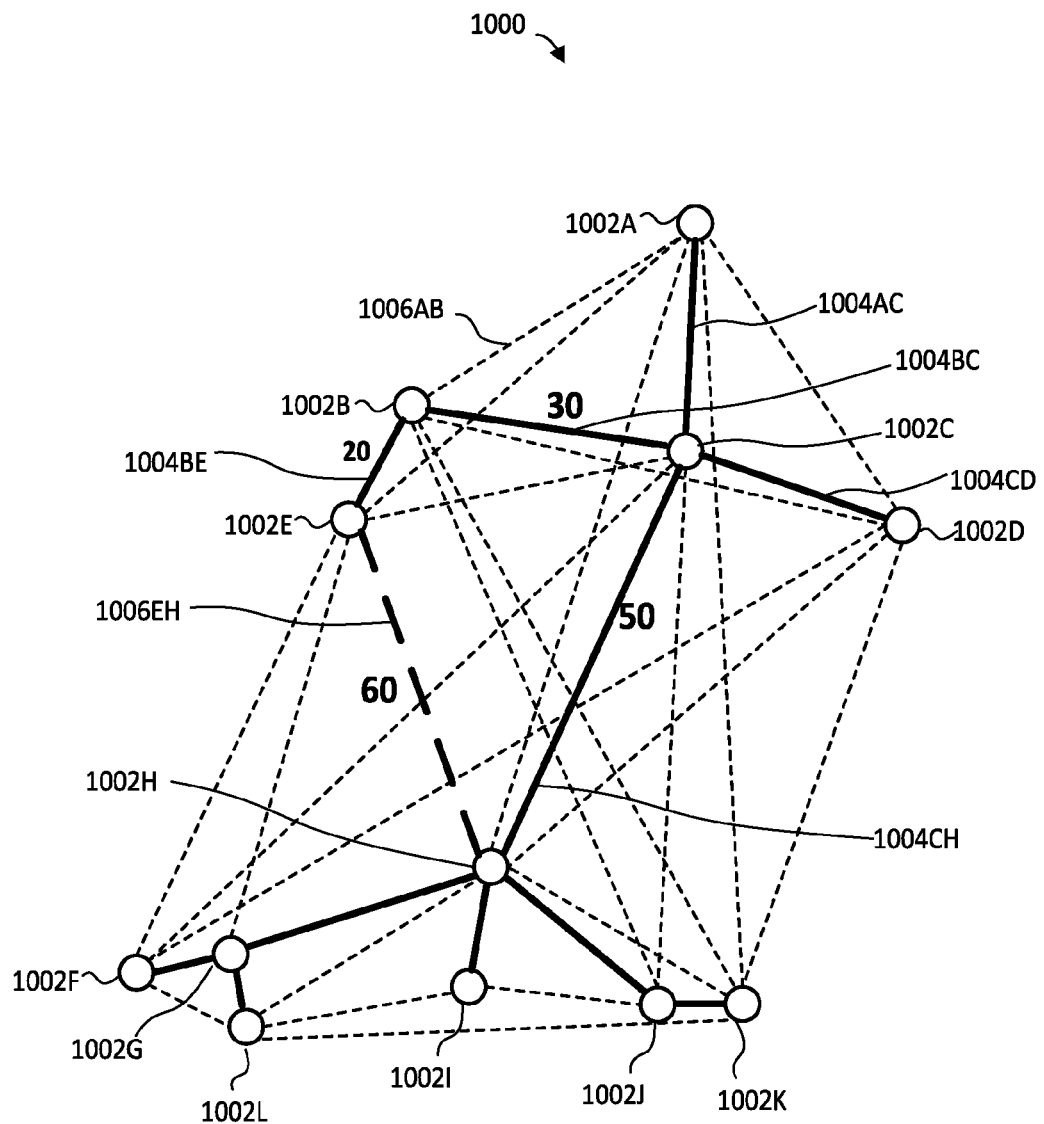

Referring for example to FIG. 10B, the routing engine 136 can determine that the edge 1006EH interconnecting nodes 1002E and 1002H has a weight of 60. A path between the same two nodes along the MST includes the edge 10004BE with weight 20, the edge 1004BC with weight 30, and the edge 1004CH with weight 50, for the combined weight of 100. When the routing engine 136 applies the threshold value of 1.1, the improvement of 60 over 100 is large enough for the routing engine 136 to add the edge 1006EH to the MST as a part of defining a navigation graph.

Figure 10C:
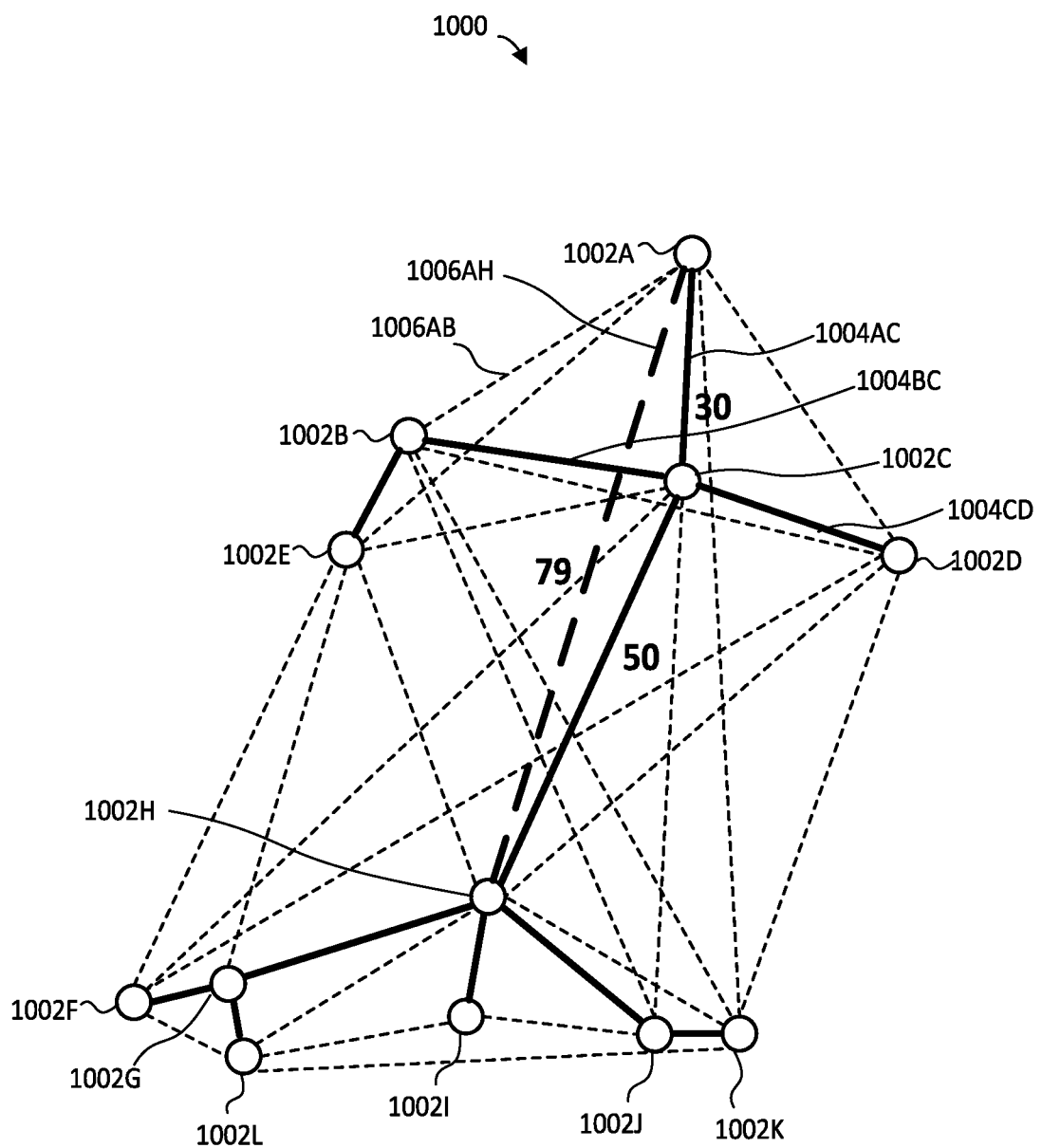

On the other hand, referring to FIG. 10C, the routing engine 136 can determine that the edge 1006AH with weight 79 provides only a 1.25% improvement along the path between the nodes 1002A and 1002H along the MST (including the edges 1004AC and 1004CH, with a combined weight of 80), and excludes the edge 1006AH from the navigation graph.

Figure 10D:
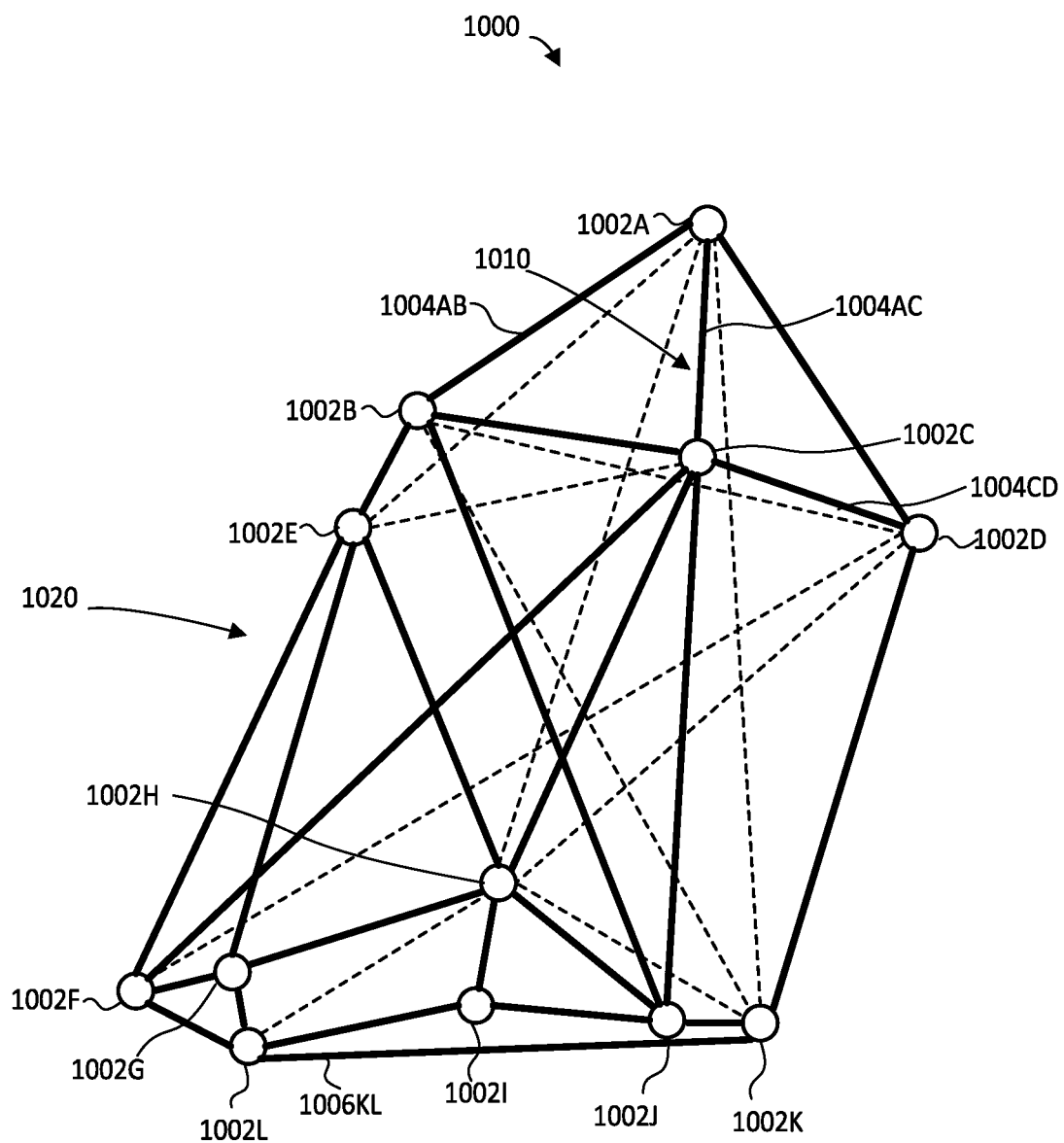

FIG. 10D illustrates a navigation graph 1020 the routing engine 1036 can construct on the basis of the graph 1000. The navigation graph 1020 include the entire MST 1010 as well as some but not all of the edges of the graph 1000 excluded from the MST 1010. The navigation graph 1020 has fewer edges that the graph 1000 and, as such, simplifies the task of generating a navigation route between a source location and a destination. Referring back to FIGS. 7A-C, the navigation graph 1020 can operate as the graph 700, to which the routing engine can temporarily attach nodes representing the starting location and the destination.

In addition to reducing the time the routing engine 136 requires to process a request for navigation directions, the navigation graph 1020 requires less memory than the underlying highly connected graph 700. Example storage of the navigation graph 1020 or a similar navigation graph is briefly considered next.

Figure 9:
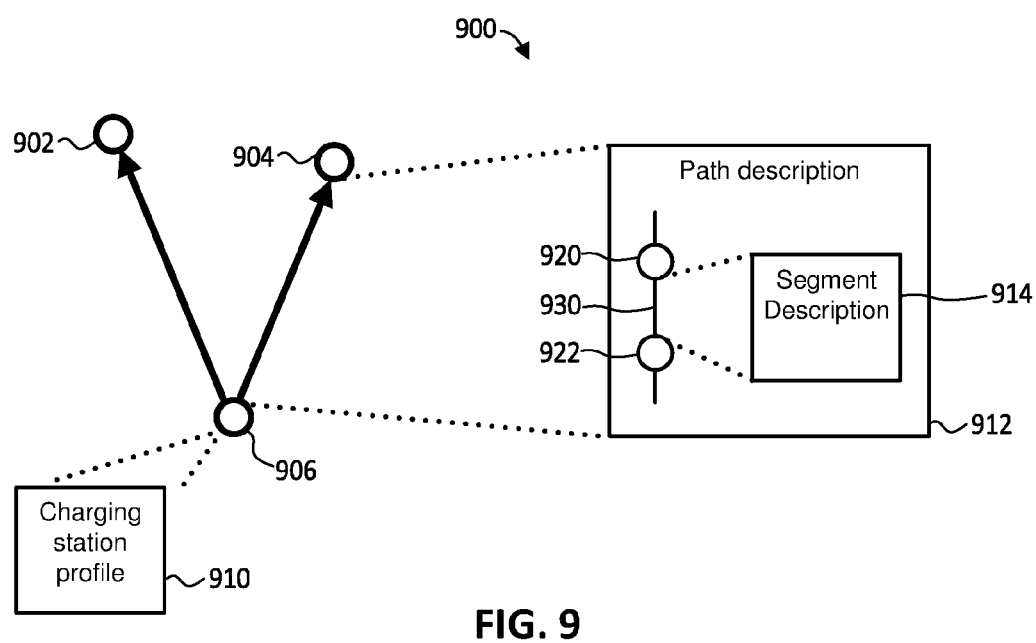
FIG. 9 illustrates a fragment of an example graph the system of FIG. 1 can pre-compute.

Referring to FIG. 9, a graph fragment 900 can be a portion of the graph 1020 or 700. The graph fragment 900 includes nodes 902, 904, and 906, representing charging stations, and edges interconnecting nodes 902 and 906, and 904 and 906. The server 130 stores a profile record 910 for each node. The record 910 can indicate for example the relationship between time and an amount of charge (see FIG. 3). In some implementations discussed with reference to FIG. 11, the record 910 can store a bipartite graph to represent these dependencies. Further, the record can indicate the compatibility of hardware at the charging station, the number of ports, real-time data such as the current occupancy, etc.

For each edge of the navigation graph, the server 130 can store a path description record 912 that includes waypoint data for waypoints 920, 922, etc. and the road segment information 914 for road segments between pairs of waypoints. The road segment information 914 can indicate distances, changes in elevation, etc.

Figure 11:
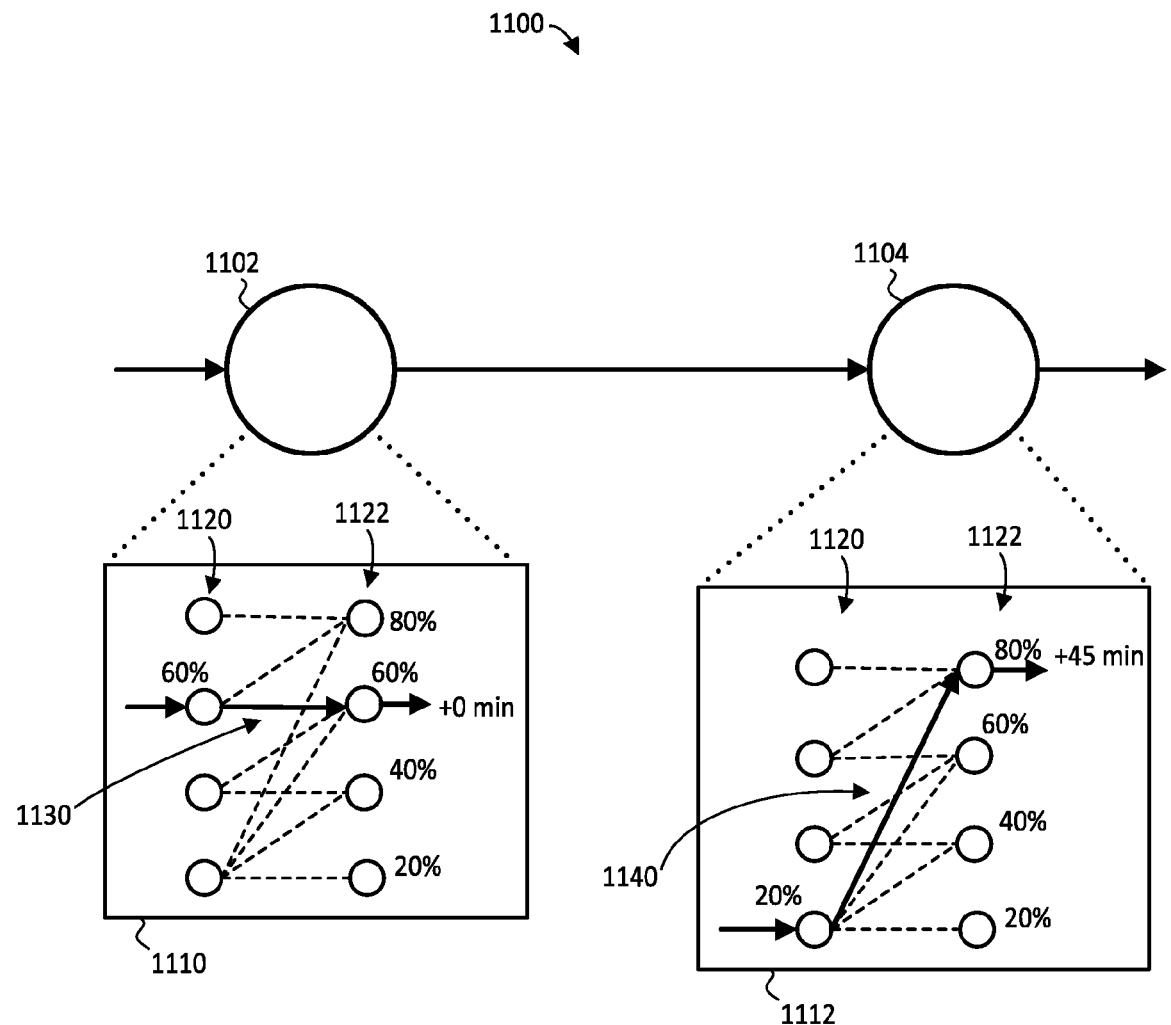
FIG. 11 illustrates how the system of FIG. 1 generates a bipartite graph for a node that represents a charging station, to represent various charging.

Now referring to FIG. 11, a diagram 1100 illustrates how the routing engine 136 can generate a bipartite graph for a node that represents a charging station. By substituting a bipartite graph for a node in the navigation 700 or 1020 for example, the routing engine 136 can directly apply a graph search technique such as Dijsktra's or A* to the resulting graph.

As illustrated in FIG. 11, the server 130 can represent a node 1102 as a bipartite graph 1110 with a set of input sub-nodes 1120 and a set of output sub-nodes 1122. Each of the sub-nodes 1120 is connected to one or more sub-nodes 1122. The input sub-nodes and the output sub-modes represents certain states of charge. Edges between sub-nodes corresponding to the same state of charge have the weight of zero, e.g., an EV entering a charging station with 60% of the charge and existing the charging station with same amount of charge is presumed to spend zero minutes at the charging station. Thus, when the routing engine 136 determines that an EV should drive past a charging station without stopping (e.g., because the EV will have sufficient charge of 60% along a certain navigation route and will be able to comfortably reach the next charging station), the routing engine 136 can choose the path 1130 through the bipartite graph 1110. On other hand, the routing engine 136 can determine that the EV will reach the charging station represented by node 1104 with a 20% charge. According to the bipartite graph 1112, which can have a similar structure, but not necessarily same weights of the edges between sub-nodes, as the bipartite graph 1110, the connection between an input sub-node that represents a 20% charge and an output sub-node that represents an 80% charge has the weight of 45 minutes. The routing engine 136 can select a path 1140 in this case because for example the next edge of the navigation graph is long.

Figure 12A:
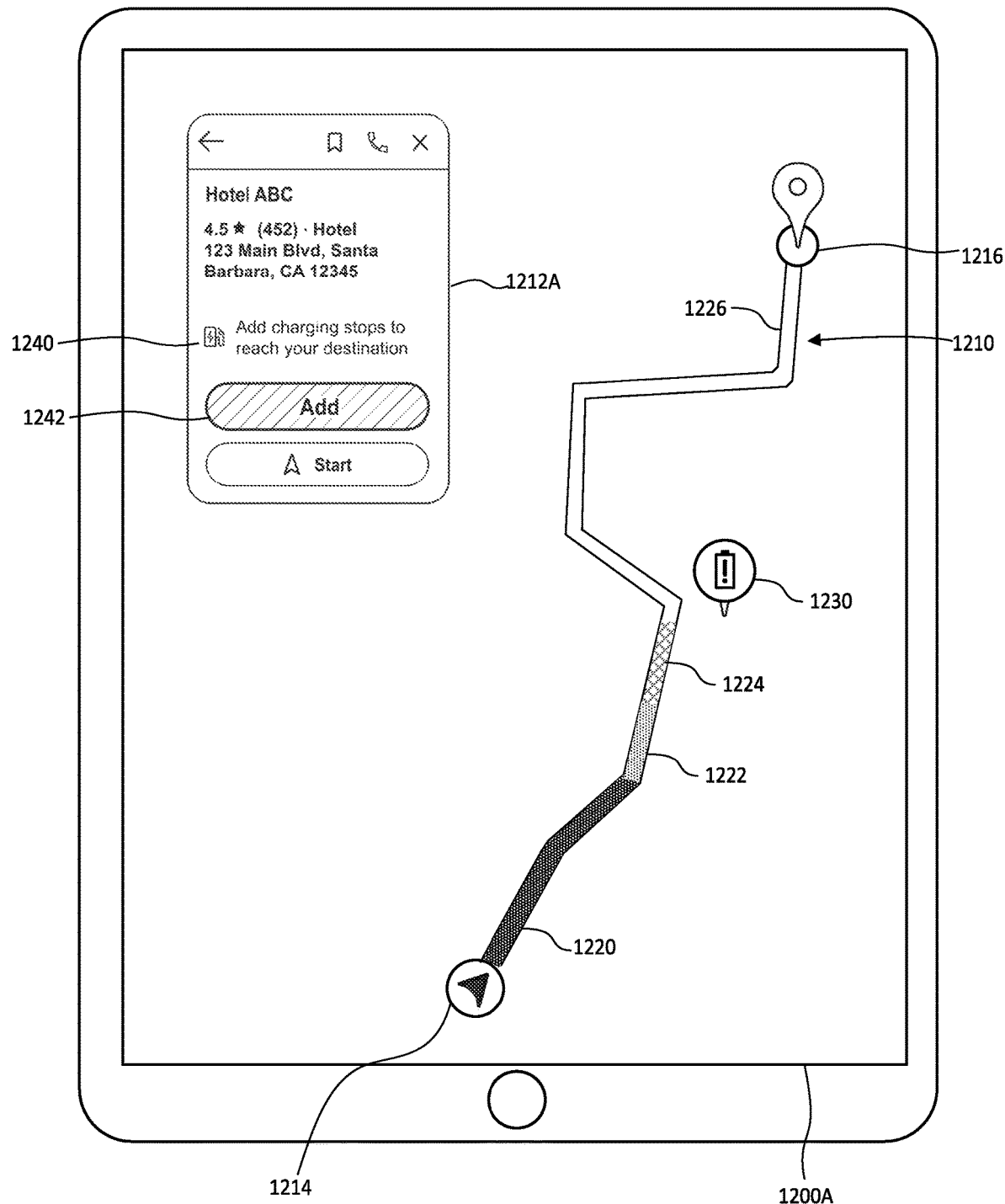
FIGS. 12A-C illustrate example user interface screens which the system of FIG. 1 can generate to provide a navigation route for an EV.
Figure 12B:
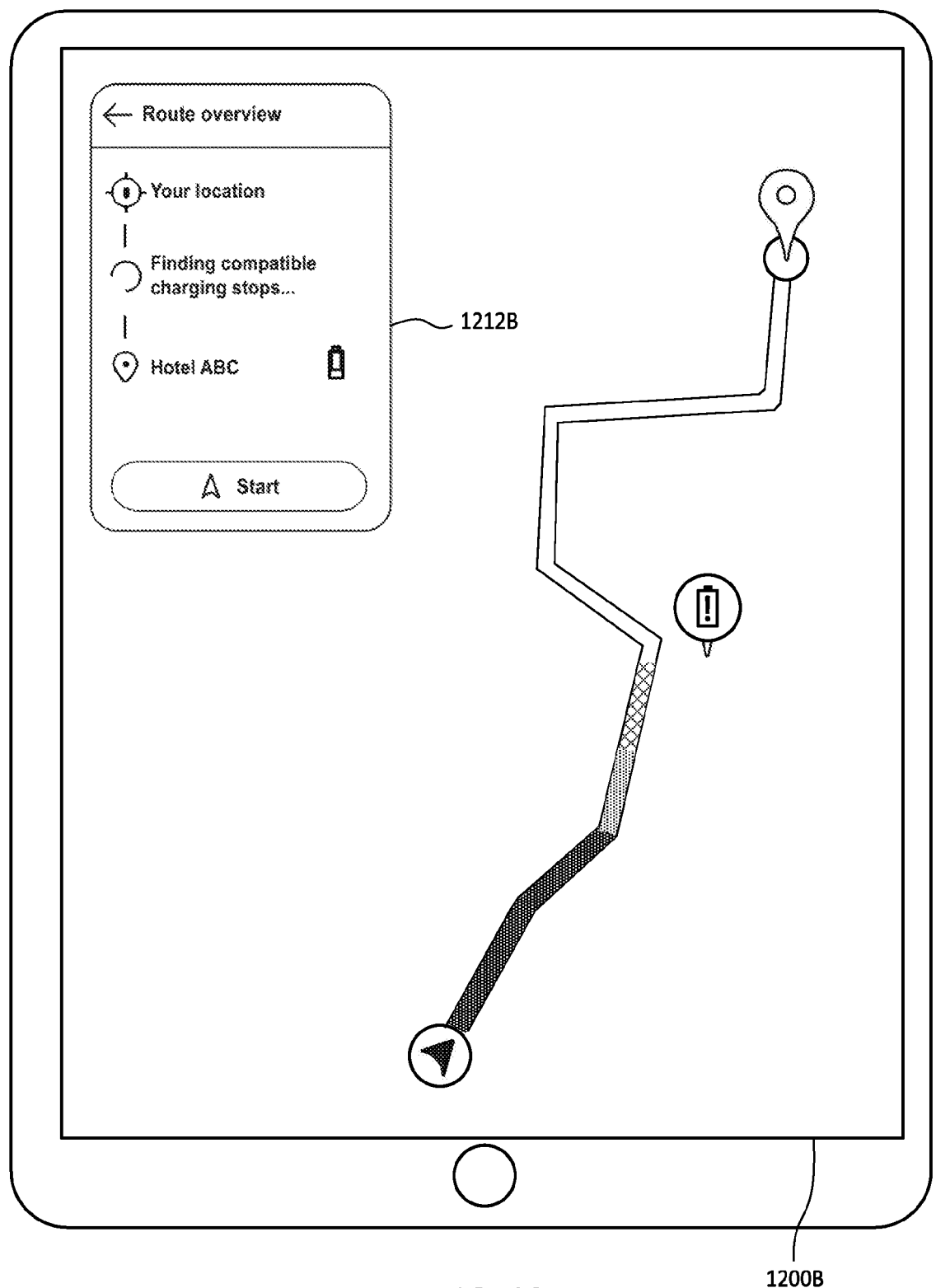
Figure 12C:
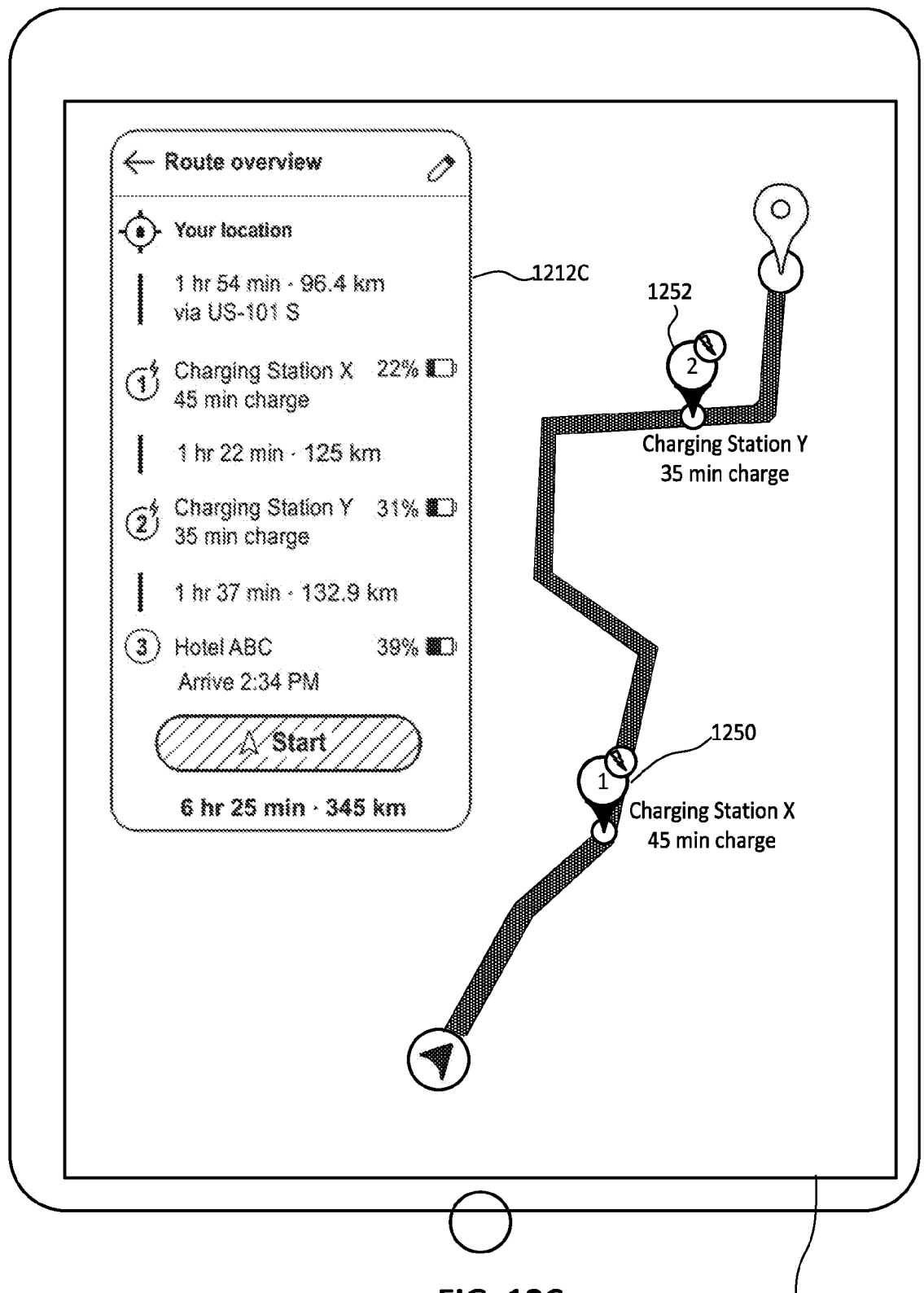

Next, FIGS. 12A-C illustrate several example UI screens which the system of FIG. 1 can generate to provide a navigation route for an EV. For example, the navigation application 108 can present these UI screens to the user via the user interface 116. The navigation application 108 can generate these screens using data received from the navigation server 130 for example.

Referring first to FIG. 12A, the navigation application 108 can present a UI screen 1200A on a portable device or via the head unit of a vehicle for example. The UI screen 1200A includes a graphic 1210 for a navigation route between a certain starting location indicated by icon 1214 and a destination indicated by icon 1216. The UI screen 1200A can apply different colors, shading, or other visual effects to the graphic 1210 to indicate different states of charge along the path. Thus, a segment 1220 can indicate a large amount of remaining charge, a segment 1222 can indicate a smaller amount of remaining charge, and a segment 1224 can indicate an even smaller amount of remaining charge. A segment 1226 can indicate no remaining charge. A warning icon 1230 can approximately indicate a location at which the EV is expected to run out of charge.

The UI screen 1200A also can include an interactive window 1212A in which the navigation application 108 provides information about the destination, a recommendation 1240 to add a charging stop, an interactive control 1240 via which the user can request that the routing engine 136 add a charging station to the navigation route, and another interactive control 1242 via which the user can request the navigation directions without adding a charging station.

Depending on the implementation, the routing engine 136 can generate the navigation route represented by the graphic 1210 in view of the charging stations, e.g., using the techniques discussed above, or without attempting to route the EV via the charging stations, to provide the same navigation route as the routing engine 136 would present to a conventional vehicle.

Now referring to FIG. 12B, the user can request that the routing engine 136 add charging stations to the navigation route. The navigation application 108 can present a UI screen 1200B in which a window 1212B provides an indication that compatible charging stops are being identified and added to the navigation route.

FIG. 12C illustrates a UI screen 1200C after generating a navigation route including a daisy chain of charging stations. The UI screen 1200C can include a window 1212C with an overview of the navigation route. For example, the window 1212C can indicate, for each charging stop, the name of the charging station, the time the EV should spend at the charging station, and the amount of charge the EV should have upon exiting the charging station. The UI screen 1200C can update the graphic 1210 to include visual representations 1250 and 1252 of the charging stations. In some implementations, the navigation application 108 also can update the graphic 1210 to indicate that there is sufficient charge for every segment.

Figure 13:
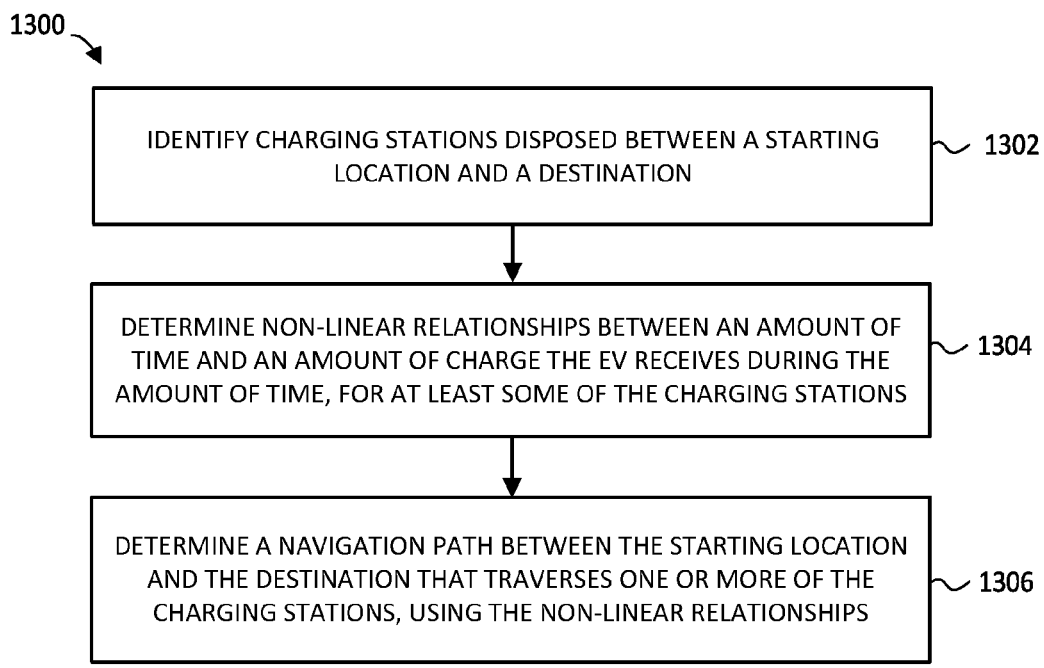
FIG. 13 is a flow diagram of an example method for generating a navigation route for an EV, which can be implemented in the system of FIG. 1.

For further clarity, FIG. 13 illustrates a flow diagram 1300 of an example method for generating a navigation route for an EV, which the routing engine 136 (or, in some implementations, the navigation application 108 can implement). At block 1302, the routing engine 136 can identify charging stations disposed between a starting location and a destination. As discussed above, the routing engine 136 can use a navigation graph such as the graph 700 or 1020.

At block 1304, the routing engine 136 can determine respective non-linear relationships between an amount of time and an amount of charge for the charging stations. The routing engine 136 can represent these non-linear relationships (see FIG. 3) as bipartite graphs for example, as discussed above with reference to FIG. 11.

At block 1306, the routing engine 136 can a navigation path between the starting location and the destination, where the navigation path traverses one or more charging stations. As discussed above with reference to FIGS. 7A-C, the routing engine 136 can generate temporary nodes for the starting location and the destination.

Additional Considerations

The following additional considerations apply to the foregoing discussion. Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter of the present disclosure.

Additionally, certain embodiments are described herein as including logic or a number of components, modules, or mechanisms. Modules may constitute either software modules (e.g., code stored on a machine-readable medium) or hardware modules. A hardware module is tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term hardware should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware and software modules can provide information to, and receive information from, other hardware and/or software modules. Accordingly, the described hardware modules may be regarded as being communicatively coupled. Where multiple of such hardware or software modules exist contemporaneously, communications may be achieved through signal transmission (e.g., over appropriate circuits and buses) that connect the hardware or software modules. In embodiments in which multiple hardware modules or software are configured or instantiated at different times, communications between such hardware or software modules may be achieved, for example, through the storage and retrieval of information in memory structures to which the multiple hardware or software modules have access. For example, one hardware or software module may perform an operation and store the output of that operation in a memory device to which it is communicatively coupled. A further hardware or software module may then, at a later time, access the memory device to retrieve and process the stored output. Hardware and software modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods or routines described herein may be at least partially processor-implemented. For example, at least some of the operations of a method may be performed by one or more processors or processor-implemented hardware modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as an SaaS. For example, as indicated above, at least some of the operations may be performed by a group of computers (as examples of machines including processors), these operations being accessible via a network (e.g., the Internet) and via one or more appropriate interfaces (e.g., APIs).

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Some portions of this specification are presented in terms of algorithms or symbolic representations of operations on data stored as bits or binary digital signals within a machine memory (e.g., a computer memory). These algorithms or symbolic representations are examples of techniques used by those of ordinary skill in the data processing arts to convey the substance of their work to others skilled in the art. As used herein, an "algorithm" or a "routine" is a self-consistent sequence of operations or similar processing leading to a desired result. In this context, algorithms, routines and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the description. This description should be read to include one or at least one and the singular also includes the plural unless it is obvious that it is meant otherwise.

Upon reading this disclosure, those of skill in the art will appreciate still additional alternative structural and functional designs for generating navigation routes for ele through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

What is claimed is:

1. A method for navigating an electric vehicle (EV) from a starting location to a destination, the method comprising:
   determining a first non-linear relationship between an amount of time and an amount of charge the EV receives during the amount of time, the non-linear relationship being based on an EV charge profile defining a charging speed as a function of the charge of the EV;
   identifying, by processing hardware, a plurality of charging stations between the starting location and the destination;
   determining, by the one or more processors, a second non-linear relationship between an amount of time and an amount of charge provided by one of the plurality of charging stations, the second non-linear relationship being based on a station charge profile defining the charging speed as a function of the percent of charge provided by the one of the plurality of charging stations;
   determining, by the processing hardware, a navigation route that requires a least amount of time for the (EV) to:
   (i) travel from the starting location to the destination, and
   (ii) to charge at each of the charging stations, based on the comparing the EV charge profile with the station charge profile for each of the plurality of charging stations; and
   providing, by the processing hardware, a set of navigation instructions for traveling from the starting location to the destination along the navigation route for display on a user interface that causes the EV to be controlled in accordance with the navigation instructions to travel to the destination along the navigation route, including two or more stops at the two or more charging stations.

2. The method of claim 1, wherein determining the navigation route includes:
   constructing a navigation graph in which at least some of the plurality of charging stations define respective nodes, and routes between the charging stations define edges.

3. The method of claim 2, wherein constructing the graph includes:
   constructing an initial highly connected graph in which each of the plurality of charging stations represents a respective node, with N edges interconnecting the plurality of nodes;
   identifying a minimum spanning tree (MST) of the initial highly connected graph; and
   generating the navigation graph by adding some but not all of the N edges of the initial highly connected graph to the MST.

4. The method of claim 2, further comprising:
   generating, for at least some of the plurality nodes, a representation of the corresponding charging station as a bipartite graph, in which:
   a first set of sub-nodes represents amounts of charge upon entering the charging station,
   a second set of sub-nodes represents amounts of charge upon exiting the charging station, and
   edges between sub-nodes in the first set and sub-nodes in the second set define time delays associated with the corresponding increase in charge.

5. The method of claim 2, wherein constructing the navigation graph includes selecting, within the plurality of charging stations, charging stations compatible with the EV.

6. The method of claim 2, wherein constructing the navigation graph includes:
   excluding from the navigation graph charging stations with a trust score below a trust threshold value.

7. The method of claim 2, further comprising pre-computing the navigation graph prior receiving a request for navigation directions.

8. The method of claim 2, further comprising:
   generating a first node to represent the starting location;
   generating a second node to represent the destination; and
   connecting the first node and the second node to the graph.

9. The method of claim 2, wherein:
   determining the navigation route includes applying an A* search algorithm to the navigation graph.

10. The method of claim 1, further comprising:
    providing an option for a user to select an ecological route; and
    generating the ecological route that optimizes energy consumption.

11. The method of claim 10, wherein generating the ecological route includes avoiding changes in elevation.

12. The method of claim 10, further comprising: generating the user interface screen, including applying levels of highlighting to different segments in accordance with a state of the charge of a battery expected for the segment.

13. The method of claim 10, further comprising:
    receiving real-time data indicative of availability of ports at the daisy chain of charging stations; and
    automatically updating the navigation route in view of the received real-time data.

14. A system comprising: one or more processors; and
    a non-transitory computer-readable medium storing instructions that, when executed by the one or more processors, cause the system to:
    determine a first non-linear relationship between an amount of time and an amount of charge the electric vehicle (EV) receives during the amount of time, the non-linear relationship being based on an EV charge profile defining a charging speed as a function of the charge of the EV;
    identify a plurality of charging stations between the starting location and the destination;
    determine a second non-linear relationship between an amount of time and an amount of charge provided by one of the plurality of charging stations, the second non-linear relationship being based on a station charge profile defining the charging speed as a function of the percent of charge provided by the one of the plurality of charging stations;
    determine a navigation route that requires a least amount of time for the to:
    (i) travel from the starting location to the destination, and (ii) charge at each of the charging stations, based on the comparing the EV charge profile with the station charge profile for each of the plurality of charging stations; and provide a set of navigation instructions for traveling from the starting location to the destination along the navigation route for display on a user interface that causes the EV to be controlled in accordance with the navigation instructions to travel to the destination along the navigation route, including two or more stops at the two or more charging stations.

15. The system of claim 14, wherein to determine the navigation route, the instructions cause the system to:

construct a navigation graph in which at least some of the plurality of charging stations define respective nodes, and routes between the charging stations define edges.

16. The system of claim 15, wherein to construct the graph, the instructions cause the system to:

construct an initial highly connected graph in which each of the plurality of charging stations represents a respective node, with N edges interconnecting the plurality of nodes;

identify a minimum spanning tree (MST) of the initial highly connected graph; generate the navigation graph by adding some but not all of the N edges of the initial highly connected graph to the MST.

17. The system of claim 15, wherein the instructions further cause the system to:

generate, for at least some of the plurality nodes, a representation of the corresponding charging station as a bipartite graph, in which:

a first set of sub-nodes represents amounts of charge upon entering the charging station, a second set of sub-nodes represents amounts of charge upon exiting the charging station, and edges between sub-nodes in the first set and sub-nodes in the second set define time delays associated with the corresponding increase in charge.

18. The system of claim 15, wherein to construct the graph, the instructions cause the system to:

select, within the plurality of charging stations, charging stations compatible with the EV.

19. The system of claim 15, wherein to construct the graph, the instructions cause the system to:

exclude from the navigation graph charging stations with a trust score below a trust threshold value.

20. The system of claim 15, wherein the instructions cause the system to:

pre-compute the navigation graph prior receiving a request for navigation directions.

* * * * *